United States Patent Office 2,797,595
Patented July 2, 1957

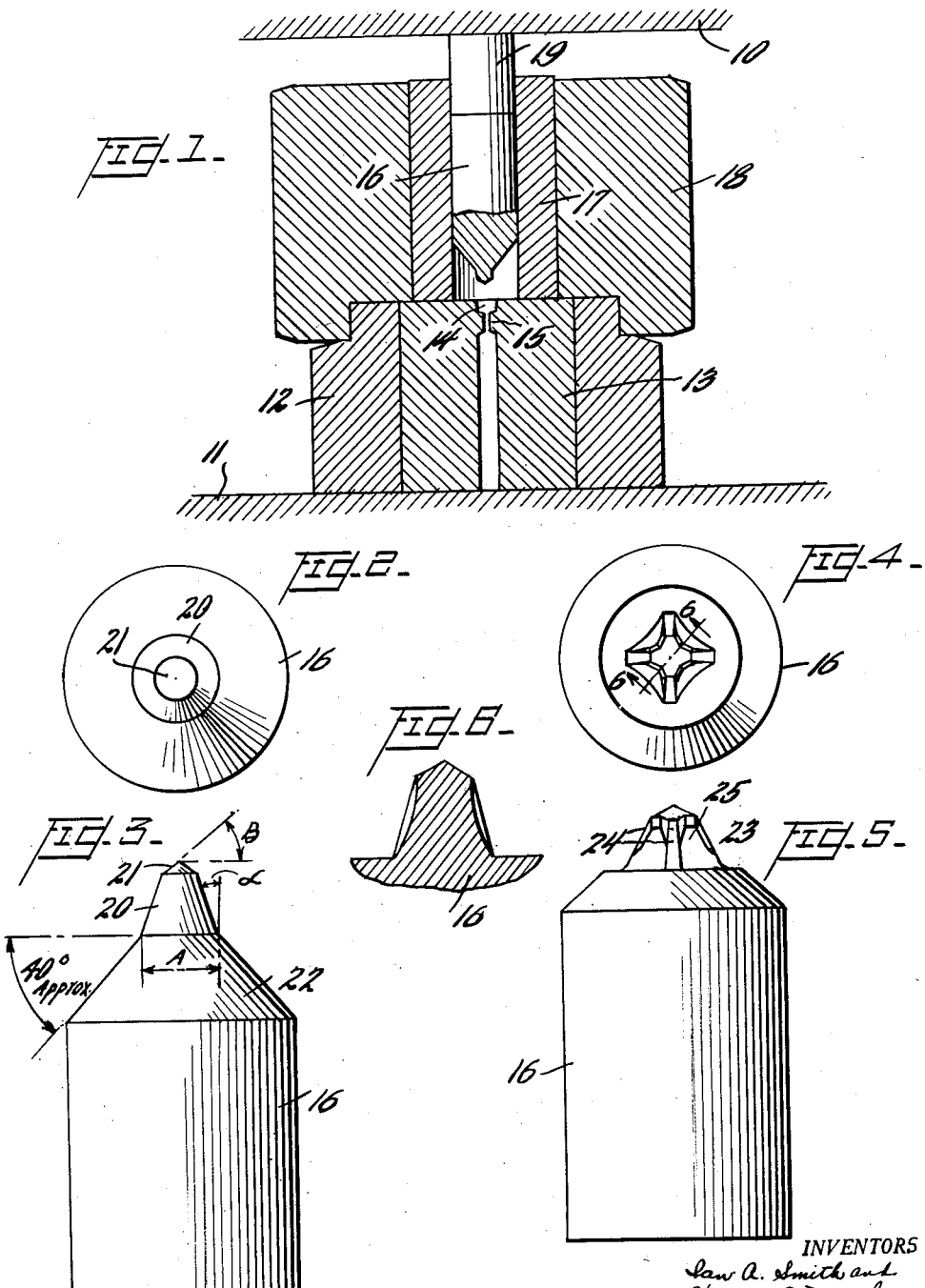

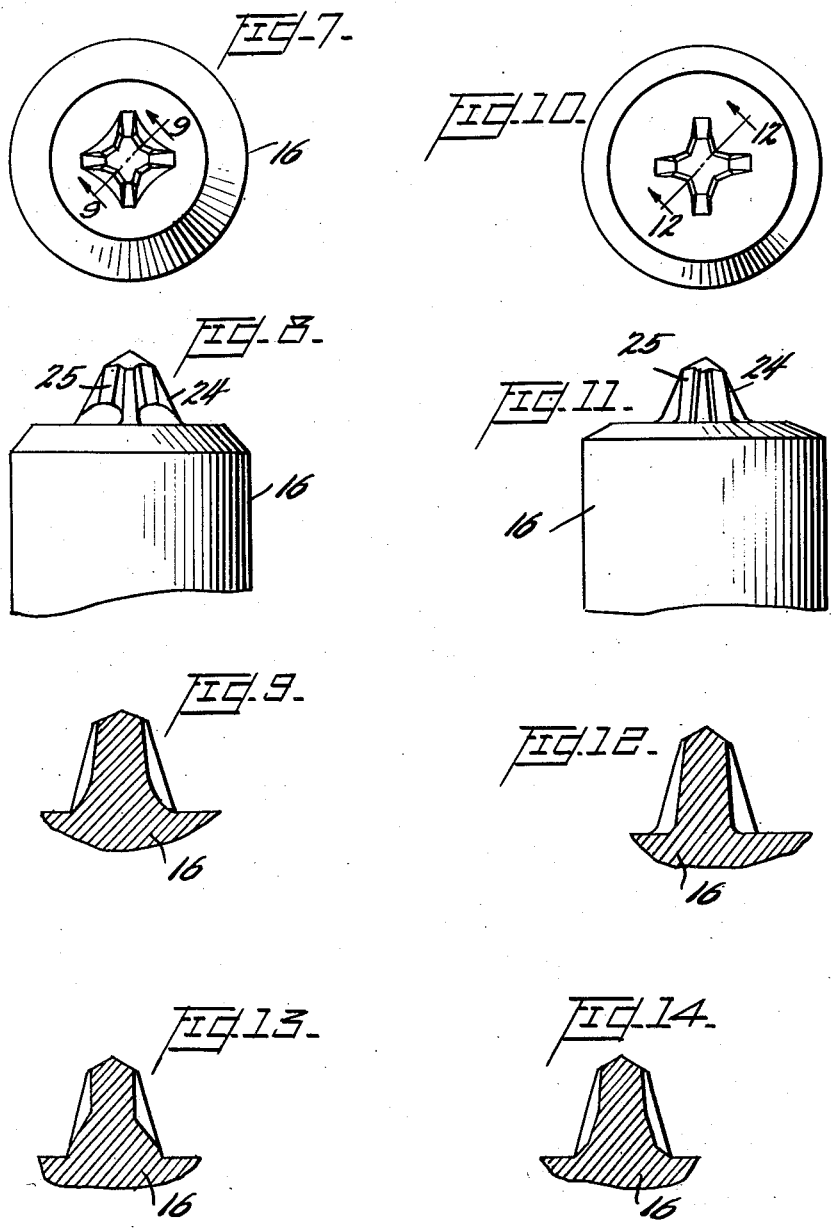

2,797,595

METHOD OF HOBBING RECESS-FORMING PUNCHES

Ian A. Smith, Willimantic, and Herman G. Muenchinger, Chaplin, Conn., assignors to American Screw Company, Willimantic, Conn., a corporation of Rhode Island Application April 2, 1954, Serial No. 420,544

7 Claims. (Cl. 76—107)

The present invention relates to methods of manufacturing punches for forming the recesses in recessed head screws and the like, and tools for engagement in such recesses, and more particularly to a multiple-step method for shaping such punches and tools by cold hobbing, i. e., cold flow of the metal of the work-piece.

The commercial practice presently followed in the manufacture of punches for recessed head screws and the like, particularly the so-called "Phillips" screws, is generally that described and illustrated in United States Patent No. 2,066,372. According to this practice, the punch blanks are first turned from the bar on a screw machine following which they are chucked individually in a lathe and the conical nib and adjoining face are finished to uniform size and contour. Next the four flutes of the nib are formed by an end milling operation as described in the aforesaid patent. Lastly, the milled blank is typed, i. e., finished by pressing it into a master die having a recess exactly complementary in shape to the desired finished punch.

The end milling operation is not only the most important but by far the most troublesome step of the method currently in use. In this operation, it is essential that material be removed in such a way as to permit a relative uniform displacement and compression of metal in the final typing operation. Unfortunately, it is frequently impossible to accomplish this purpose with exactness, particularly when one is dealing with punches having comparatively long nibs for the reason that when an end mill of relatively small diameter is employed leaving the proper amount of material at the tip of the nib, an excess of metal is left on the faces of the flutes or wings toward the base of the nib; while if a larger end mill is used, which would leave the proper amount of metal for typing toward the base of the nib, the flutes are severely undercut. In practice, it is frequently necessary to compromise by use of an intermediate size of end mill, or by two milling operations, first with a small end mill and then with a larger end mill positioned so that the undercut will be held to a minimum. Occasionally, conically shaped end mills have been tried, but these have proved very costly and difficult to use. The problem is particularly acute in the manufacture of punches for large diameter screws having deep recesses.

The aforesaid difficulties occur in the production of punches not only for "Phillips" screws but for recessed items generally, when the punches are produced in one piece in accordance with the aforesaid United States Patent No. 2,066,372. The present inventors have found that it is not only the depth or length of the nib but the recess proportions which contribute to the problem. For example, difficulty may be expected in producing any punch, even of normal nib length, if the relationship between the angle of the outer faces of the flutes to the axis of the nib, and the angle between the floors of the valleys between the flutes and the nib axis, exceeds a 3.5 to 1 proportion and if the point diameter of the nib exceeds the milling diameter at the point by more than 50%.

These difficulties in punch milling are, of course, reflected in the typing operation which follows, and result in folds, partial shearing and improper development of the nib due to partial underfilling of the die. In addition, because of the heavy pressure required in the final hobbing, elastic deformation of both the die and the punch has been experienced, resulting in serious distortion of the angles of the punch. It has been attempted to remove this difficulty by compensation or reduction of the angles of the die by the amount of the distortion. Usually this compensation is ineffective, however, because the two surfaces in adjoining areas are usually distorted to a curved shape. Moreover, the aforesaid folding tends to produce a point of weakness at the junction of the nib and the body of the punch, reducing the fatigue strength of the punch to but a fraction of that normally to be expected.

Accordingly, it is an object of the present invention to obviate the aforesaid difficulties and disadvantages by the provision of a cold flow method of producing punches for forming cruciform recesses, regardless of the relative proportions between the length and diameter, or the angles of the various nib surfaces to each other, which method includes two or more sequential hobbing operations in which the punch nib is completely formed without fracture, shear or unfavorable distortion of the grain flow.

More specifically, it is an object of the invention to provide a method of hobbing recess-forming punches, driving tools for recessed-head screws, and like metal articles having fluted nibs, comprising the steps of preparing a work-piece of suitable shape, lubricating said work-piece, compressing said work-piece axially to deform the nib section of the work-piece to partially form the desired fluted nib, while restraining the work-piece against lateral expansion thereof, releasing the pressure on the work-piece, re-lubricating the partially deformed work-piece, again compressing the work-piece axially while restraining it laterally to further deform the nib section toward the shape of the desired fluted nib, and repeating these steps until the desired nib is completely formed, the successive compressions being performed with the aid of separate dies having recesses successively approaching a shape exactly complementary to the desired finished nib.

Other and further objects, features and advantages will be apparent from the description which follows, read in connection with the accompanying drawings in which—

Figure 1 is a diagrammatic vertical section illustrating an apparatus suitable for carrying out the method of the invention;

Figures 2 and 3 illustrate, in plan and elevation, respectively, a work-piece or punch blank ready for forming according to the present invention;

Figures 4, 5, and 6 illustrate, in plan, elevation and fragmentary axial section, respectively, the work-piece in the intermediate stage representing completion of the first compressing operation;

Figures 7, 8, and 9 illustrate in plan, elevation and fragmentary axial section, respectively, the nib end of the punch blank after completion of the second pressing operation;

Figures 10, 11, and 12 illustrate in plan, elevation and fragmentary axial section, respectively, the same portion of the punch blank after the final pressing operation; and Figures 13 and 14 illustrate in fragmentary axial section the nib portion of a work-piece which is in process of being formed by the same method but with the use of somewhat different dies.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the jaws or like members of a suitable press, for example a hydraulic press, are indicated by the numerals 10 and 11. Upon the latter there is positioned a die holder 12 having a cylindrical opening therethrough, in which is positioned a die 13 having a desired recess 14 which is vented as at 15. The punch blank or work-piece 16 is carried in a sleeve 17 mounted in turn within the punch holder 18 fitted upon the upper end of the die holder 12. A plug or block 19 surmounts the blank 16 within the sleeve 17 and serves to transmit the pressure of the body 10 to the work-piece 16. It will be understood that the arrangements for holding the die and work-piece are optional, the above-described arrangement being given only by way of example.

For carrying out the present method it has been found that the punch blank or work-piece 16 may advantageously be formed as illustrated in Figures 2 and 3 in which the cone angle α of the frusto-conical surface 20 is approximately 5° less than the corresponding angle of the desired finished punch, and the cone angle β of the conical surface 21 equals the corresponding angle of the desired finished punch. The cone angle of the frusto-conical surface 22 may vary somewhat but an angle of approximately 40° to the longitudinal axis of the work-piece has been found most satisfactory. The dimension A of the work-piece must approximate the corresponding dimension of the desired finished punch.

The die 13 employed in the first pressing operation is provided with a recess 14 which is complementary to the nib 23 of the intermediate product illustrated in Figures 4, 5, and 6. That is to say the surfaces of the die recess toward the mouth of such recess have been modified, or relieved, in such a way that only the deepest portion of the recess i. e., that corresponding to the distal portion or extremity of the punch nib, is the exact counterpart of the corresponding portion of the desired finished punch nib. The widest portions of the recess, i. e., those corresponding to the faces of the flutes 24 of the nib, are unmodified throughout their depth, but the inwardly projecting ribs of the recess, corresponding to the valleys 25 between the flutes of the punch nib, are relieved or modified as by counterboring or otherwise.

As a result of the first pressing operation, therefore, only the distal portion or extremity of the nib of the work-piece is brought to its final form, as best illustrated in Figure 5. After this operation, the pressure is released, the work-piece is removed and re-lubricated, for example with special molybdenum sulphide and phosphate compounds, and a die 13 of slightly different form is substituted for that used in the first operation. The work-piece is then re-inserted in the sleeve 17 and a second pressing operation is performed.

The die employed in the second pressing operation may correspond to the intermediate product illustrated in Figures 7, 8 and 9, for example. That is, the lower and intermediate portions of the die recess may correspond exactly to the shape of the desired finished punch nib, but the surfaces of the upper end of the recess are relieved, as by counterboring or otherwise, to some such extent as indicated by the shape of the intermediate product seen in Figure 8. The relieved surfaces of the dies used in the first and second pressing operations may be parti-toroidal, as indicated in Figures 6 and 9, the radius of the cut corresponding approximately to the length of the desired relieved portion of the die recess for the particular operation, or such relieved surfaces may be plane conical as indicated in Figures 13 and 14.

After the second pressing operation the pressure is released, the work-piece removed and re-lubricated, and a further die substituted, as before. The die used in the third pressing operation may, as in the described operation, be provided with a recess corresponding exactly to the desired finished punch nib, or it may be another intermediate die, if more than three pressing operations are required due to the desired height of the punch nib, or for other reasons.

It will be noted that in the course of the several pressing operations the vertical length of the frusto-conical portion 22 of the work-piece is considerably shortened, the starting condition being illustrated in Figure 3, and the final condition being seen in Figure 11. At the same time, the vertical height or length of the punch nib will have been lengthened for example, by several thousandths of an inch, over the corresponding dimension of the work-piece with which the operation was started. It is thus indicated that the nib formation has been accomplished by means of true metal flow, or extrusion, with the result that there has been no shearing or folding of the metal with resultant weakening of the finished punch. It has been found that the grain structure of punch nibs produced according to the method of the invention is quite satisfactory, and that punches produced by this method have very satisfactory strength and life characteristics.

Production of punches by the above-described method is much less costly than by the methods heretofore used. Attempts have been made to produce recess forming punches from a work-piece corresponding to that of the present method in that the end milling operation is dispensed with, by means of a single pressing or typing operation employing a die corresponding exactly to the finished punch nib. Such punches have been found unsatisfactory due to inaccuracy resulting from incomplete formation, and also by reason of weakness due to shearing or folding of the metal of the work-piece during the drastic deformation required by this single-step process. A further factor of importance is that in performing the drastic deformation required, by the said single-step method, it is impossible to preserve a continuous film of lubricant upon the surface of the work-piece, which fact doubtless contributes to the unsatisfactory result mentioned. On the contrary, in the practice of the present method the work-piece may be lubricated three or more times during its transition from its initial form to that of the finished punch, and the lubricant film is not broken during any of the partial deformation steps, but remains intact. It is significant that in most instances the finished punch may be manually withdrawn from the retaining sleeve 17 after completion of each pressing operation including the final one, whereas in the single-step method mentioned above, it is usually necessary to employ hammer blows to remove the work-piece from the retaining sleeve after the pressing operation.

Having thus described the invention, what is claimed as new and desired to be secured by Letters Patent is:

1. Method of hobbing metal articles having fluted nibs, comprising the steps of preparing a work-piece having a base section and a nib section, the latter being bounded by a plurality of surfaces of revolution, the extremity of said nib section being conical and having a vertex angle substantially equal to that of the finished work, the surface of the adjoining portion being frusto-conical and having an angle to the cone axis which is substantially equal to the corresponding angle of the finished work, measured to the outwardly-facing surfaces of the flutes, said nib section having a next adjoining portion the surface of which is frusto-conical, lubricating said work-piece, pressing said work-piece axially into a die of appropriate shape with sufficient force to deform said nib section to partially form the desired fluted nib and to shorten said next adjoining portion, while restraining the work-piece against lateral expansion thereof, releasing the pressure on the work-piece, again pressing the work-piece axially into a die of appropriate shape while restraining it laterally, with sufficient force to further deform said nib section toward the shape of the desired fluted nib and to further shorten the said next adjoining portion, and repeating the pressing step until the desired nib is completely formed, the successive pressings being performed with the aid of separate dies.

2. Method of hobbing metal articles having fluted nibs, comprising the steps of preparing a work-piece having a base section and a nib section, the latter being bounded by a plurality of surfaces of revolution, the extremity of said nib section being conical and having a vertex angle substantially equal to that of the finished work, the surface of the adjoining portion being frusto-conical and having an angle to the cone axis which is substantially equal to the corresponding angle of the finished work, measured to the outwardly-facing surfaces of the flutes, said nib section having a next adjoining portion the surface of which is frusto-conical, lubricating said work-piece, pressing said work-piece axially into a die of appropriate shape with sufficient force to deform said nib section to partially form the desired fluted nib and to shorten said next adjoining portion, while restraining the work-piece against lateral expansion thereof, releasing the pressure on the work-piece, again pressing the work-piece axially into a die of appropriate shape, while restraining it laterally, with sufficient force to further deform said nib section toward the shape of the desired fluted nib and to further shorten the said next adjoining portion, and repeating the pressing step until the desired nib is completely formed, each successive compression causing a flow of metal generally axially of said work-piece whereby said first adjoining portion of said nib section is increased in length and decreased in transverse sectional area.

3. The method defined in claim 1, the first said die having a recess, the axially deepest portion of which is exactly complementary to the shape of the extremity of the desired finished nib, and successive dies having recesses of which successively greater portions, beginning at the axially deepest portion, are exactly complementary to the shapes of the corresponding portions of the desired finished nib, the remaining portions of said recesses being of larger transverse sectional area than the corresponding areas of the desired finished nib.

4. The method defined in claim 1, the first said die having a recess, the axially deepest portion of which is exactly complementary to the shape of the extremity of the desired finished nib, and successive dies having recesses of which successively greater portions, beginning at the axially deepest portion, are exactly complementary to the shapes of the corresponding portions of the desired finished nib, the remaining portions of said recesses being of larger transverse sectional area than the corresponding areas of the desired finished nib, the recesses of the said dies being of successively greater axial depth.

5. The method defined in claim 1, outer faces of the ribs between the flutes of the recesses of said dies being flat in their lower portions and convex in their upper portions, said upper portions curving outwardly from the planes of said lower portions, successive dies having successively longer flat rib face portions and successively shorter convex rib face portions.

6. The method defined in claim 1, the faces of the ribs between the flutes of the recesses of said dies being inclined, in their lower portions, at the angle corresponding to the desired finished nib, the upper portions of said rib faces being inclined outwardly at a greater angle, successive dies having successively longer lower rib face portions and successively shorter upper rib face portions.

7. The method defined in claim 1, including the steps of applying a film of lubricant to the work-piece before each compression thereof.

References Cited in the file of this patent
UNITED STATES PATENTS

| | | |
|---|---|---|
| 2,066,372 | Tomalis | Jan. 5, 1937 |
| 2,537,029 | Cambern | Jan. 9, 1951 |
| 2,565,948 | Cambern | Aug. 28, 1951 |
| 2,627,192 | Jenney | Feb. 3, 1953 |
| 2,638,019 | Stellin | May 12, 1953 |